(12) United States Patent
Kawaike

(10) Patent No.: US 7,421,373 B2
(45) Date of Patent: Sep. 2, 2008

(54) SUPPORT SYSTEM

(75) Inventor: Noboru Kawaike, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 513 days.

(21) Appl. No.: 10/869,047

(22) Filed: Jun. 17, 2004

(65) Prior Publication Data

US 2005/0028045 A1  Feb. 3, 2005

(30) Foreign Application Priority Data

Jun. 24, 2003  (JP) .............................. 2003-180344

(51) Int. Cl.
*G06F 11/30* (2006.01)
(52) U.S. Cl. ...................................... 702/185
(58) Field of Classification Search ................... 702/185
See application file for complete search history.

(56) References Cited

U.S. PATENT DOCUMENTS 5,561,762 A * 10/1996 Smith et al. ................. 714/33
6,108,586 A *  8/2000 Suzuki et al. ............... 700/117
6,526,326 B2 * 2/2003 Suzuki et al. ............... 700/117
2003/0004765 A1 * 1/2003 Wiegand ....................... 705/7

OTHER PUBLICATIONS

Patent Abstracts of Japan, "Failure Diagnostic Device of Vehicular Electronic System," JP Pub. No. 10-078376, abstract only.

* cited by examiner

*Primary Examiner*—Bryan Bui
*Assistant Examiner*—Aditya S Bhat
(74) *Attorney, Agent, or Firm*—Foley & Lardner LLP

(57) ABSTRACT

An improvement support system including an input unit, a display, an arithmetic processing unit and a storage unit, the storage unit stores analytical data containing analytical information corresponding to "phenomenon" or "influence" and "cause" or "measures" for each of failure modes, and malfunction generation historical data in which malfunction information formed based on the contents of malfunction and related to the failure mode of the analytical information is sequentially accumulated every time the malfunction is detected after the system is started. The arithmetic processing unit has a function of retrieving the analytical data using the malfunction information as a key and detecting the failure mode correlated with the malfunction. Thus, the number of malfunctions related to the analytical information regarding each failure mode is counted and the total number of malfunctions related to the failure mode is displayed with the contents of the failure mode in the display.

16 Claims, 8 Drawing Sheets

Constitution of improvement support system according to the present invention

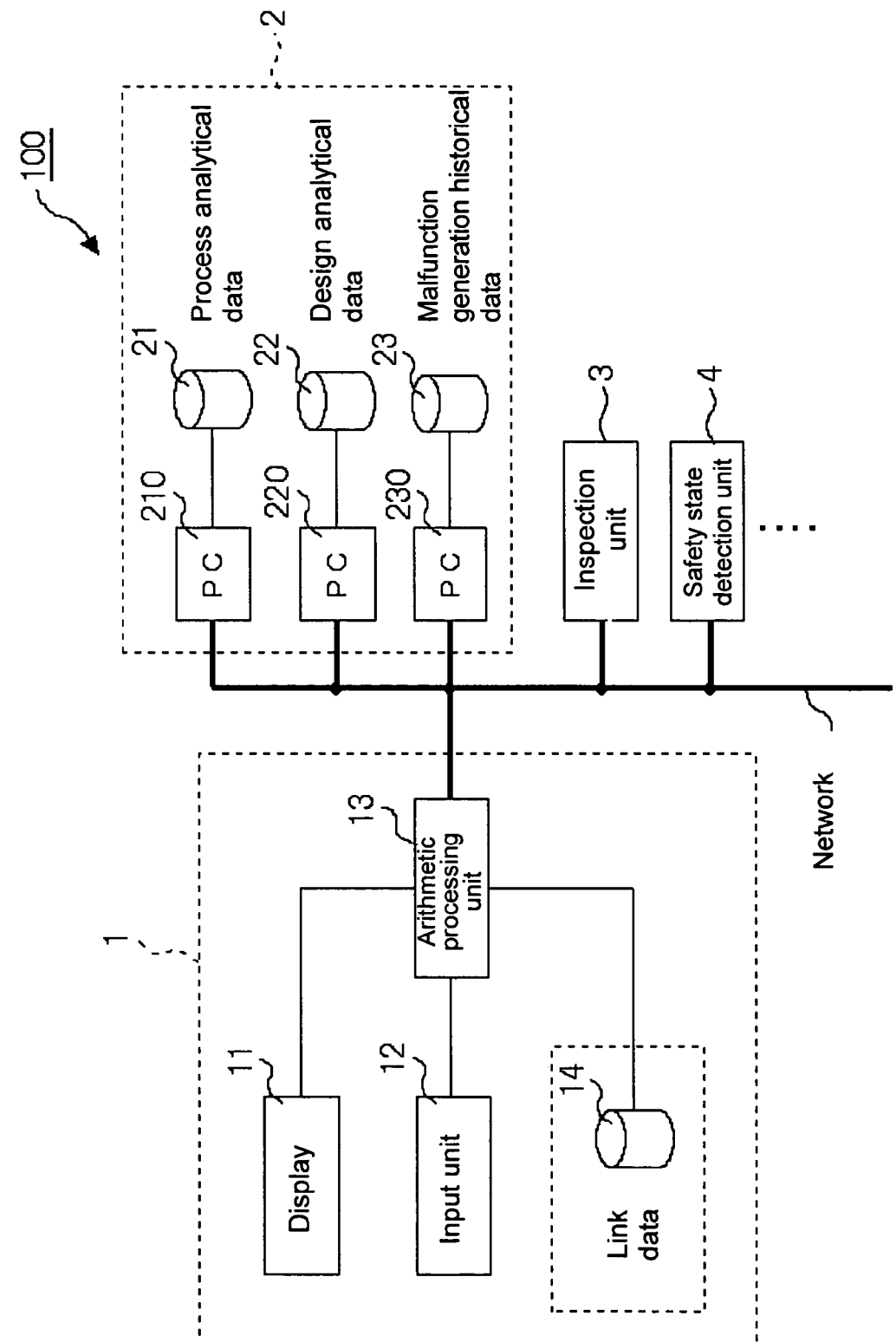
Fig. 1  Constitution of improvement support system according to the present invention

Fig. 2

| Item / Apparatus | Process part 201 | Process 202 | Function 203 | Phenomenon 204 | Influence 205 | Cause 206 | Measures 207 | 208 | Failure mode No. 209 |
|---|---|---|---|---|---|---|---|---|---|
| Photoelectric sensor (ABC-1234) | 1 | PCB division | Divided into pieces | Part cracking (near V-cut) | No functioning | Stress such as warp | ○○△△··· | ······ | 1111 |
| Photoelectric sensor (ABC-1234) | 1 | PCB division | Divided into pieces | Part comes off (near V-cut) | No functioning | Stress such as warp | ··· | ······ | 1112 |
| Photoelectric sensor (ABC-1234) | 2 | Capacitor mounting | Capacitor soldering | Capacitor breaking | No functioning | Tip standing when mounted | ··· | ······ | 2111 |
| Photoelectric sensor (ABC-1234) | 3 | LCD lead cutting | Lead length is fixed | Warp at cut part | PCB cannot be inserted | Cut edge malfunction | ··· | ······ | 3111 |
| Photoelectric sensor (ABC-1234) | 3 | LCD lead cutting | Lead length is fixed | Dimension is long | Difficult to insert PCB | Lack of press when cutting jig is set | ··· | ······ | 3112 |
| Photoelectric sensor (ABC-1234) | 4 | LD press to base member | LD fixing/ positioning | Mistake in press direction | PCB cannot be inserted | ··· | | | |

Graph showing an example of contents of process analytical data

Fig. 3

| Item Apparatus | Process part 301 | Process 302 | Function 303 | Phenomenon 304 | Influence 305 | Cause 306 | Measures 307 | Hiyari-hatto accumulated counts 308 | Accumulated counts of accidents 309 | 310 | Failure mode No. 311 |
|---|---|---|---|---|---|---|---|---|---|---|---|
| Photoelectric sensor (ABC-1234) | 1 | PCB division | Divided into pieces | Part cracking (near V-cut) | No functioning | Stress such as warp | ○◇△··· | 0 | 0 | ······ | 1111 |
| Photoelectric sensor (ABC-1234) | 1 | PCB division | Divided into pieces | Part comes off (near V-cut) | No functioning | Stress such as warp | ··· | 0 | 0 | ······ | 1112 |
| Photoelectric sensor (ABC-1234) | 2 | Capacitor mounting | Capacitor soldering | Capacitor breaking | No functioning | Tip standing when mounted | ··· | 1 | 0 | ······ | 2111 |
| Photoelectric sensor (ABC-1234) | 3 | LCD lead cutting | Lead length is fixed | Warp at cut part | PCB cannot be inserted | Cut edge malfunction | ··· | 0 | 0 | ······ | 3111 |
| Photoelectric sensor (ABC-1234) | 3 | LCD lead cutting | Lead length is fixed | Dimension is long | Difficult to insert PCB | Lack of press when cutting jig is set | ··· | 0 | 0 | ······ | 3112 |
| Photoelectric sensor (ABC-1234) | 4 | LD press to base member | LD fixing/ positioning | Mistake in press direction | PCB cannot be inserted | ··· | | | | | ······ |

Graph showing another example of contents of process analytical data

Fig. 4

| Item / Apparatus | 401 Unit | 402 Module | 403 Part | 404 Phenomenon | 405 Influence | 406 Cause | 407 Measures | 408 | 409 Failure mode No. |
|---|---|---|---|---|---|---|---|---|---|
| Photoelectric sensor (ABC-1234) | Power supply | Circuit | Capacitor | Breaking | No operation | Soldering malfunction | ... | ....... | K0101 01 01 |
| Photoelectric sensor (ABC-1234) | Power supply | Circuit | Capacitor | Short | No operation | Soldering malfunction | ... | ....... | K0101 01 02 |
| Photoelectric sensor (ABC-1234) | Power supply | Circuit | Capacitor | Capacity blur | ... | ... | ... | ....... | K0201 01 01 |
| Photoelectric sensor (ABC-1234) | Power supply | Circuit | Resistor | Breaking | ... | ... | ... | ....... | K0201 01 02 |
| Photoelectric sensor (ABC-1234) | Power supply | Circuit | Resistor | Short | ... | ... | ... | ....... | ...... |
| Photoelectric sensor (ABC-1234) | Power supply | Circuit | Resistor | ... | | | | | |

Graph showing an example of contents of design analytical data

Fig. 5

| 501 | 502 | 503 | 504 | 505 | 506 | 507 | 508 | 509 | 510 | 511 | 512 | 513 | 514 |
|---|---|---|---|---|---|---|---|---|---|---|---|---|---|
| Malfunction No. | Apparatus | Serial No./lot No. | Factory | Line name/No. | Inspection malfunction/claim | Data | Worker | Material | Method | Machine/jig | Phenomenon | Phenomenon of product malfunction | Treatment |
| DB00001 | Proximity sensor (ABC-1234) | ABC-1234 -0B2635-9 | AAAA | A-1 | Inspection malfunction | X1/Y1/Z1 | ○○○○ | X company capacitor | PCB mounting by chip mounter | α company STU-5678 | Capacitor breaking | No operation | Disposal |
| DB00002 | Proximity sensor (DEF-5678) | DEF-5678 -0271387 | BBBB | BA-21 | Claim | X2/Y2/Z2 | △△△ | Y company LD VWX-9012 | OCB insertion by manual operation | Insertion jig YZ-34 | LD insertion in reverse direction | No operation | Part exchange |
| DB00003 | .. | .. | .. | .. | .. | .. | .. | .. | .. | .. | .. | .. | .. |
| DB00004 | .. | .. | .. | .. | .. | .. | .. | .. | .. | .. | .. | .. | .. |
| .. | .. | .. | .. | .. | .. | .. | .. | .. | .. | .. | .. | .. | .. |

Graph showing contents of malfunction generation historical data

Flowchart showing procedures for newly extracting a failure mode which is not extracted from analytical data

Fig. 7A

| Failure mode No. | 1111 | 1112 | 2111 | 3111 | 3112 | ... |
|---|---|---|---|---|---|---|
| Malfunction No. | | | DB00001 | | DB00021<br>DB00015 | ... |

Fig. 7B

| Failure mode No. | K0101<br>0101 | K0101<br>0102 | K0201<br>0101 | K0201<br>0102 | K0201<br>0201 | ... |
|---|---|---|---|---|---|---|
| Malfunction No. | DB00001 | | DB00055<br>DB00015<br>DB00105 | DB00036 | | ... |

Graph (1) showing concrete example of linked relation

Fig. 8A

| Failure mode No. | DB0001 | DB0002 | DB0003 | DB0004 | ..... |
|---|---|---|---|---|---|
| Malfunction No. | 2111 | 5111<br>2311<br>6522 | | 3312 | ..... |

Fig. 8B

| Failure mode No. | DB0001 | DB0002 | DB0003 | DB0004 | ..... |
|---|---|---|---|---|---|
| Malfunction No. | K02020101<br>K02020102 | | K03020501 | K05020101<br>K04021209<br>K10130105<br>K05020104 | ..... |

Graph (2) showing concrete example of linked relation

SUPPORT SYSTEM

CROSS-REFERENCE TO RELATED APPLICATIONS

This application claims priority to Japanese application 2003-180344, filed on Jun. 24, 2003, the contents of which are incorporated by reference.

BACKGROUND OF THE INVENTION

1. Field of the Invention

The present invention relates to an improvement support system regarding production of products, in which when a problem according to quality of a process or a product, productivity, safety of operations, environments and the like is detected, it can be solved or improved as soon as possible, by previously classifying, analyzing potential malfunction, claims in the market and the like in view of parts constituting the product or manufacturing processes of the product, and taking measures for the problems.

2. Description of the Prior Art

Referring to manufacturing and developing a product in a factory, when a problem is detected by malfunction in inspection or claims from the market, production engineers or production designers skilled in the art investigate the cause of the problem based on experience or knowledge regarding the product and improve the product each time. When the problem lines in the process, the process may be improved and when the problem lies in the product, the product is exchanged, for example to be improved.

As measures for improving the above problem, methods called process FMEA (Failure Mode and Effects Analysis) and design FMEA (Failure Mode and Effects Analysis) are employed in many fields (refer to Japanese Unexamined Patent Publication No. 10-78376, for example). According to the process FMEA, a table in which malfunction generation patterns to be expected are extracted and a process, a function, a phenomenon, an influence, a cause and measures for each malfunction generation pattern are listed (process analytical data (a kind of manual)) is formed before production is started, and when malfunction is detected at the time of production, the problem is immediately improved with reference to the manual. In addition, according to the design FMEA, a table in which malfunction generation patterns to be expected are extracted, each malfunction generation pattern is classified to a unit, a module, or a part of the product and a phenomenon, an influence, a cause, measures and the like peculiar to the malfunction are listed (design analytical data (a kind of manual)) is formed before the product is manufactured and when malfunction is detected at a stage of product developing or manufacturing, the problem is immediately improved with reference to the manual.

As described above, according to the conventional method in which the production engineers or the product designers skilled in the art try to improve the problem every time it happens, the skilled person has to be stationed. Needless to say, it is necessary to considerably acquire experience to be skilled, and it is not easy to collect the necessary number of skilled people when production is started. In addition, if many skilled people are stationed, the cost is surely increased.

In addition, according to the FMEA method, although it is improved to be effective in many fields, there is a problem in response when the malfunction is detected. That is, it is necessary to specify a corresponding pattern among many malfunction patterns previously provided when the malfunction is generated after the system is started. This specification is not always easy and in the present situation, previously provided many patterns have to be examined to investigate its cause every time the malfunction is detected.

SUMMARY OF THE INVENTION

The present invention was made in view of the above problems and it is an object of the present invention to provide an improvement support system in which a user is supported such that detected malfunction can be immediately and appropriately improved without a skilled person in the art.

It is anther object of the present invention to provide an improvement support system in which a user is supported such that effective treatment for improvement can be performed by automatically weighting various kinds of malfunction to be detected.

Still another object and operation effects of the present invention may be easily understood by persons skilled in the art with reference to the following description in the specification.

An improvement support system according to this embodiment comprises an input unit, a display, an arithmetic processing unit and a storage unit.

For a product failure to be expected, the storage unit stores (1) analytical data comprising analytical information having information corresponding to "phenomenon" or "influence" and "cause" or "measures" for each of a plurality of failure modes which are classified in view of parts constituting the product or manufacturing processes of the product, and (2) malfunction generation historical data formed based on malfunction contents detected in manufacturing processes of the product in which malfunction information having information corresponding to the "phenomenon" or "influence" of the failure mode in the analytical information is sequentially accumulated.

Here, not only the previously extracted data but also various kinds of information obtained after the system is started can be reflected in the "analytical information".

The "malfunction information" maybe manually input through the input unit or may be automatically input from a separately provided inspection unit and the like.

Thus, the arithmetic processing unit detects a failure mode having information corresponding to the "phenomenon" or "influence" by searching the analytical data, based on information corresponding to the "phenomenon" or "influence" contained in the malfunction information, relates the detected failure mode to the malfunction information, counts the total number of malfunctions related to the detected failure mode, and displays the contents of the failure mode together with the total number or based on the total number in the display.

According to the improvement support system of this embodiment, since the failure mode can be automatically specified, the generated malfunction can be immediately and appropriately improved without a skilled person. In addition, according to the improvement support system of this embodiment, since the number of malfunctions related to the analytical information according to each failure mode is counted and the total number of malfunctions related to the failure mode is displayed together with the contents of the failure mode in the display, an occurrence ratio or occurrence frequency of the malfunctions can be found out. Thus, effective measures in which malfunctions to be improved can be sequentially treated in the order of priorities can be taken. In addition, in the case "the contents of the failure mode is displayed based on the total number in the display", there are a case they are displayed with numerals or signs in the descending order of the number, a case they are displayed with a graph, a case they are displayed with failure modes in the descending order of the number.

According to an improvement support system of this embodiment, the storage unit may have link data. That is, for a product failure to be expected, the storage unit may store (1) analytical data comprising analytical information having information corresponding to "phenomenon" or "influence" and "cause" or "measures" for each of a plurality of failure modes which are classified in view of parts constituting the product or manufacturing processes of the product, (2) malfunction generation historical data formed based on malfunction contents detected in manufacturing processes of the product in which malfunction information having information corresponding to the "phenomenon" or "influence" of the failure mode in the analytical information is sequentially accumulated, and (3) link data which records a relation between the failure mode of the analytical data and the malfunction information of the malfunction generation historical data, which have substantially equivalent information corresponding to the "phenomenon" or "influence", and the arithmetic processing unit may search the analytical data, based on information corresponding to the "phenomenon" or "influence" contained in the malfunction information, record the relation between the failure mode of the analytical data and the malfunction information of the malfunction generation historical data in the link data, count the total number of malfunctions related to the detected failure mode, and display the contents of the failure mode together with the total number or based on the total number in the display.

Preferably, according to the improvement support system of this embodiment, the arithmetic processing unit forms the link data for relating the malfunction information with the failure mode when detects the failure mode having information coinciding with (corresponding to) the "phenomenon" or "influence" of the malfunction information. In this aspect, even when certain modification is appropriately added to the analytical data, the linked relation is prevented from being canceled.

According to the improvement support system of this embodiment, preferably, the analytical information is formed based on a process FMEA method and/or a design FMEA method.

Since the analytical information formed on the basis of the process FMEA is mainly for the process, it is highly possible that the same analytical information is used for other product manufacturing processes. The same is true for the analytical information formed on the basis of the design FMEA. Furthermore, it is highly possible that the malfunction generation historical data is used. Therefore, once the system is started, the system can be used for other product manufacturing processes in many cased. As a result, the system is not always constituted each time.

According to an improvement support system of the present invention in which the process FMEA method is employed, the storage unit stores (1) analytical data comprising analytical information having information corresponding to "phenomenon" or "influence" and "cause" or "measures" for each of a plurality of failure modes which are classified in view of manufacturing processes of the product by the process FMEA method, (2) malfunction generation historical data formed based on malfunction contents detected in manufacturing processes of the product in which malfunction information having information corresponding to the "phenomenon" or "influence" of the failure mode in the analytical information is sequentially accumulated, and (3) link data recording a relation between the failure mode of the analytical data and the malfunction information of the malfunction generation historical data, which have substantially equivalent information corresponding to the "phenomenon" or "influence". The arithmetic processing unit searches the analytical data, based on information corresponding to the "phenomenon" or "influence" contained in the malfunction information, records the relation between the failure mode of the analytical data and the malfunction information of the malfunction generation historical data in the link data, counts the total number of malfunctions related to the detected failure mode using the link data, and displays the total number together with the contents of the failure mode in the display.

According to another embodiment of the present invention, for a product failure to be expected, the storage unit stores analytical data comprising analytical information having information corresponding to "phenomenon" or "influence" and "cause" or "measures" and "cost required for improvement" for each of a plurality of failure modes which are classified in view of parts constituting the product or manufacturing processes of the product, and malfunction generation historical data formed based on malfunction contents detected in manufacturing processes of the product in which malfunction information having information corresponding to the "phenomenon" or "influence" of the failure mode in the analytical information is sequentially accumulated. The arithmetic processing unit searches the analytical data, based on information corresponding to the "phenomenon" or "influence" contained in the malfunction information, detects a corresponding failure mode in the analytical data, relates the detected failure mode to the malfunction information, counts the total number of malfunctions related to the detected failure mode, and displays the total number together with the contents of the failure mode including the "cost required for improvement" in the display.

An improvement support system according to still another embodiment of the present invention comprises further a safety state detection unit other than an input unit, a display, an arithmetic processing unit, a storage unit. For a product failure to be expected, the storage unit stores (1) analytical data comprising analytical information having information corresponding to "phenomenon" or "influence" and "cause" or "measures" and "accumulated counts of reception of output signals" from the safety state detection unit for each of a plurality of failure modes which are classified in view of manufacturing processes, and (2) malfunction generation historical data formed based on malfunction contents detected in manufacturing processes of the product in which malfunction information having information corresponding to the "phenomenon" or "influence" of the failure mode in the analytical information is sequentially accumulated. The arithmetic processing unit searches the analytical data based on information corresponding to the "phenomenon" or "influence" contained in the malfunction information, detects a corresponding failure mode, specifies a failure mode corresponding to the safety state detection unit when receives an output signal from the safety state detection unit, increments the number of "accumulated counts of reception of output signals" in the analytical information item of the specified failure mode by one, counts the total number of malfunctions related to the detected failure mode, and displays the total number together with the contents of the failure mode including the "accumulated counts of reception of output signals" in the display. According to such improvement support system, since more dangerous process can be clear, the process to be improved in its early stage can be easily found out without a skilled person. That is, the safety state detection unit detects that a person approaches an apparatus or a machine which is a dangerous source and the like or a switch or a sensor for stopping the operation of the machine. More specifically, there are a safety mat switch, an emergency stop switch, a two-hand operation switch, a tape switch, a light curtain and the like. The safety state detection unit detects a dangerous state in which an accident could occur and outputs a hiyari-hatto signal. Since it is said that the hiyari-hatto becomes an accident one in 34 chance, the dangerous process can be clear and the process to be immediately improved can be easily found out by recording the accumulated counts of signal outputs of the safety state detection unit corresponding to the number of times of the hiyari-hatto and displaying it so as to correspond to each mode of the process FMEA. That is, improvement can be implemented with appropriate priorities and the possibility of the accident can be lowered.

In addition, according to a further preferable example, the analytical information further comprises "accumulated counts of accidents" and "amount of damage of accident" as the information unit. Thus, since the amount of damage by the accident can be also known, the user can easily recognize the necessity of the improvement.

According to another embodiment of the present invention, for a product failure to be expected, there are provided an analytical database storing analytical information having information corresponding to "phenomenon" or "influence" and "cause" or "measures" for each of a plurality of failure modes which are classified in view of parts constituting the product or manufacturing processes of the product, and a track record database storing malfunction generation historical data formed based on malfunction contents detected in manufacturing processes of the product in which malfunction information having information corresponding to the "phenomenon" or "influence" of the failure mode in the analytical information is sequentially accumulated. The arithmetic processing unit searches the analytical data, based on information corresponding to the "phenomenon" or "influence" contained in the malfunction information, detects and relates the corresponding failure mode, and displays the analytical information of the failure mode related to the malfunction information in the display when the malfunction information is input.

As the improvement points which can be commonly applied the above embodiments, there are following points (1) to (4)

(1) The storage unit is constituted such that a database storing the analytical information and a database storing the malfunction generation historical data are connected over a network. Thus, since many databases can be connected to be used over a wide range, quality of the system can be improved.

(2) Each failure mode of the analytical data is appropriately added and accumulated every time new malfunction contents which does not correspond to the "phenomenon" or "influence" in the information are detected. Thus, so-called automatic learning can be implemented in the system.

(3) Contents of both or either one of the analytical data and the malfunction generation historical data can be rewritten every item. Thus, the quality of the system can be improved.

(4) The contents of any analytical data or malfunction generation historical data can be displayed in the display through the input unit. Thus, the contents can be appropriately checked so that functional improvement can be further implemented.

As described above, according to the improvement support of the present invention or the improvement support method using the improvement support system, the cause of the malfunction of the product design and process design can be easily and accurately found out, immediate and appropriate measures can be appropriately taken and the analytical data based on the FMEA method can be immediately formed.

BRIEF DESCRIPTION OF THE DRAWINGS

FIG. 1 shows a view showing a constitution of an improvement support system according to the present invention.

FIG. 2 shows a graph (1) showing an example of the contents of process analytical data.

FIG. 3 shows a graph (2) showing another example of the contents of process analytical data.

FIG. 4 shows a graph showing an example of the contents of design analytical data.

FIG. 5 shows a graph showing an example of the contents of malfunction generation historical data.

FIG. 7 shows a graph (1) showing an example of the contents of link data.

FIG. 8 shows a graph (2) showing another example of the contents of link data.

DESCRIPTION OF THE PREFERRED EMBODIMENTS

Figure 6:
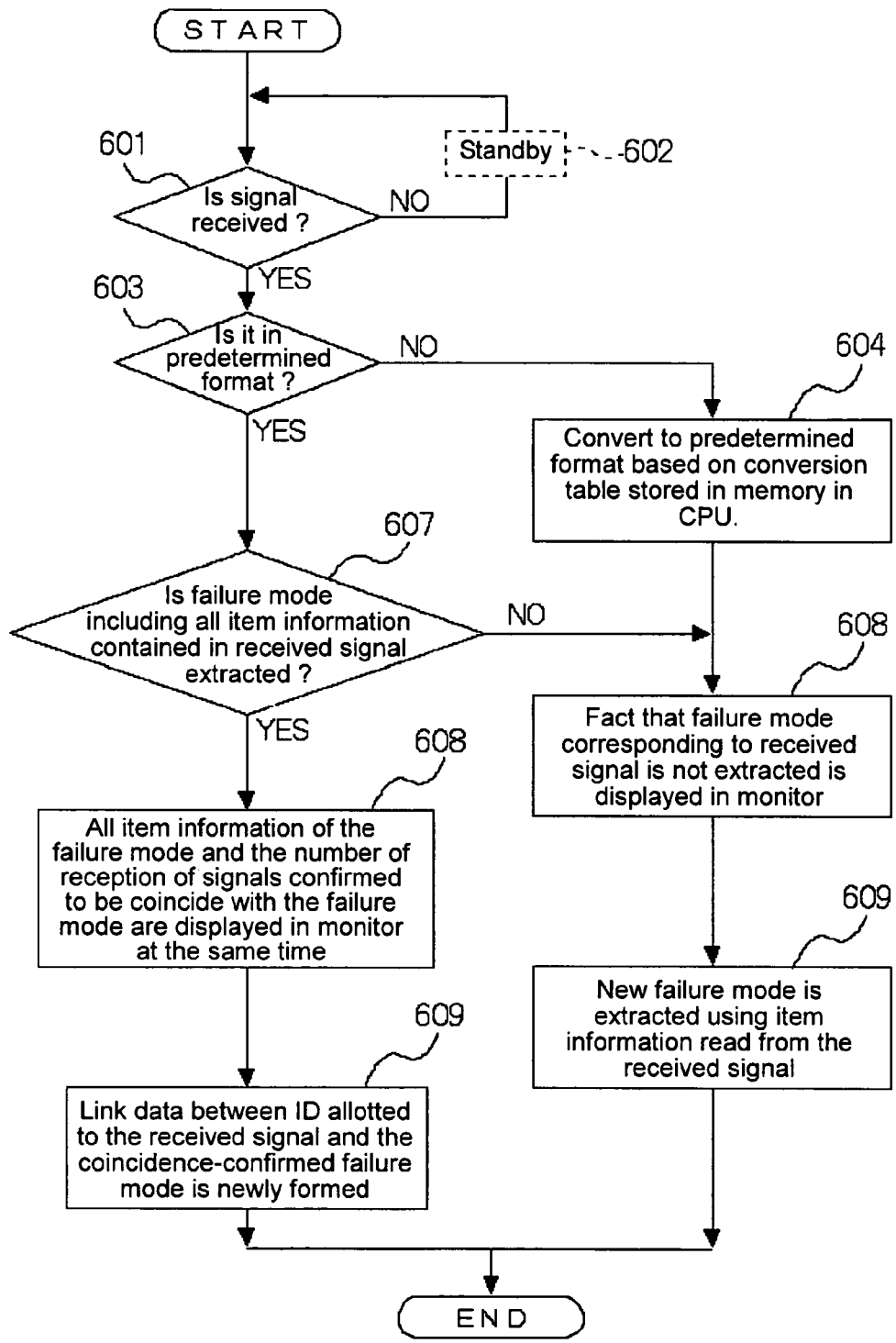
FIG. 6 shows a flowchart showing processing procedures for additionally registering a new failure mode.

Herein after, one preferred embodiment of an improvement support system according to the present invention is described with reference to accompanying drawings. In addition, the following embodiment illustrates one concrete example of the present invention and the present invention is only defined by description of claims.

FIG. 1 shows a constitution of an improvement support system according to this embodiment. As shown in FIG. 1, the improvement support system 100 is constituted by connecting an information processing system 1, a database (external storage unit group) 2, one or more inspection unit 3 and one or more safety state detection unit 4 on a network.

The information processing system 1 serves as the center of the improvement support system 100 and comprises a display 11 such as a liquid crystal display, an input unit 12 such as a key board or a mouse, an arithmetic processing unit 13 consisting of a CPU and the like which is provided with an internal memory, and a link data storage unit 14 for storing link data as will be described below. In this example, the information processing system 1 is implemented with a commercially available personal computer.

The database 2 comprises three external storage units disposed in different places in this example. Either one of them comprises a personal computer and a storage unit, in which data can be read by performing keyword searches or the like, and new data can be added (written). One of them comprises a personal computer 210 and a storage unit 21 in which process analytical data as will be described below is stored. Another one of them comprises a personal computer 220 and a storage unit 22 in which design analytical data as will be described below is stored. Still another one of them comprises a personal computer 230 and a storage unit 23 in which malfunction generation historical data as will be described below is stored.

Although the storage units 21, 22 and 23 of the database 2 may be directly connected to the information processing system 1, they are connected to it through personal computers 210, 220 and 230 on a network in this example intentionally, because the database is generally in a different sector (places) in some forms in many cases and it exists in a different location in general. Therefore, in this constitution, even when a product design, a process design or the like goes through a change, it is not necessary to form a new database. As a result, the improvement support system can be immediately constituted at minimum labor by just arranging the data owned in predetermined sections.

The inspection unit 3 serves as a detection unit for malfunction of a product. It comprises a reader function of reading a serial number or a lot number of an object product and can transmit the serial number or the lot number of the product depending on an inspection result, to the information processing system 1 together with inspection result data (normal or abnormal). In addition, the inspection result can be directly input from the input unit 12 to the information processing system 1. In this example, the inspection unit 3 can be connected to other computers, PLC or other apparatuses over network. In this constitution, when malfunction is detected, an associated section and the like are immediately informed of that effect and its detailed information over the network. In addition, this notice is not always given every time malfunction occurs, and it can be set so as to be given only when malfunction of unknown cause occurs.

The in formation processing system 1 is described in detail. As the display 11, a monitor display is used, for example. As the input unit 12, a keyboard, a mouse, a bar code reader, an ID reader and the like are used. According to this embodiment, through the input unit 12, data is input to the database 2 or the link data storage unit 14 or various kinds of processing orders to the information processing system 1 itself are carried out and the like. More specifically, the information processing system 1 records (writes) data corresponding to an appropriate data item in the database 2 and the link data storage unit 14, carries out a given order, and displays processing contents by the information processing system 1 and contents of the database and the link data in a certain form (characters, graphics, signs and the like) designated by the input unit 12, in the display 11. As essential processing, when malfunction is detected, process analytical data or design analytical data (both consist of data classified by failure modes and ID number is allotted to each failure mode) which corresponds to the contents of the malfunction (at least data specifying a phenomenon or an influence) is retrieved, and when there is corresponding data, ID number is allotted to the contents of the malfunction and recorded as malfunction generation historical data, and link data correlating the malfunction ID number with the corresponding ID of the process analytical data and the design analytical data is recorded in the link data storage unit 14. At the same time, the contents of the corresponding process analytical data and the design analytical data are displayed in the display 11.

Hereinafter, the process analytical data, the design analytical data, the malfunction generation historical data and the link data are sequentially described in detail.

FIG. 2 shows an example of contents of the process analytical data. As shown in FIG. 2, the process analytical data is formed based on a process FMEA such that associated analytical data is recorded every malfunction content ("failure mode") generated in the manufacturing process item by item. The items comprise a unit name (type), a process part number (201), a malfunctioning process (202), a function of the process (203), a phenomenon generated by the process malfunction (204), an influence caused by the process malfunction (205), a cause of the malfunction (206), measures previously studied (207), an ID number of failure mode (failure mode No.) (209). Any item can be provided depending on a usage purpose of the system of the present invention. The process analytical data is formed based on anticipation of persons skilled in the art such that contents corresponding to each item are recorded before production is started or when the production is started. In addition, according to need, the contents of some failure modes may be collected to be a set of data (as a module), whereby process analytical data for another product can be immediately formed.

In addition, according to the information processing system 1 shown in FIG. 1, data can be sorted on the basis of item contents designated by the input unit 12 and displayed in the display 11 although it is not shown. For example, in the item of "influence" (205), a data row (horizontal line) can be rearranged in descending order of frequency of appearance. Alternatively, only data containing certain information can be displayed by selecting the item and designating the contents. More specifically, when the item of "influence" (205) is selected and "no function" is input, the data including its contents can be only displayed. In addition, the plural items can be sorted in the order of priorities or selectively displayed. More specifically, the data row in the item of "process" (202) may be sorted in descending order of frequency of appearance as the first priority and the item of "phenomena" (204) may be displayed in descending order of frequency of appearance as the second priority. In addition, as described above, since technique in which contents of some failure modes are collected as a module, and technique in which a method of sort display or a display method by orders by weighting are well-known in the art, their description is omitted here.

FIG. 3 shows another preferable example of contents of process analytical data. As shown in FIG. 3, the items of the process analytical data shown in this example, similar to in FIG. 2, comprise a unit name (type), a process part number (301), a malfunctioning process (302), a function of the process (303), a phenomenon generated by the process malfunction (304), an influence caused by the process malfunction (305), a cause of the malfunction (306), measures previously studied (307), an ID number of a failure mode (failure mode No.) (311). This example is different from that in FIG. 2 in that "hiyari-hatto accumulated counts" (308) and "accumulated counts of accidents" (309) are added to the above items.

The "hiyari-hatto accumulated counts" shows the number of times of reception of output signals from the safety state detection unit 4 shown in FIG. 1. Here, the "safety state detection unit" means a switch or a sensor for detecting a state in which a person approaches an apparatus or a machine which is a dangerous source and the like or for stopping the operation of the machine. More specifically, there are a safety mat switch, an emergency stop switch, a two-hand operation switch, a tape switch, a light curtain and the like. Since the apparatus on which the safety state detection unit such as the light curtain is previously known, the process in which the apparatus is used is well-known. Thus, process data corresponding to the safety state detection unit in which each safety state detection unit is previously related to the corresponding failure mode No. of the process analytical data can be previously made. That is, when it is found out that the safety state detection unit is mounted on which apparatus and process, the analytical data corresponding to it can be specified. More specifically, the following case is assumed.

The light curtain is employed as the safety state detection unit, for example. When the human body enters a detection region of the light curtain, the light curtain outputs a light-shielded detection signal (detection signal) and also transmits information which specifies that the safety state detection unit is mounted on which apparatus or machine, to the information processing system 1. The safety state detection unit may directly out put a unique identification number, or a controller or a control unit connected to the safety state detection unit may output the unique identification number. In addition, the information processing system may specify it based on the input number of a terminal and the like. The information processing system 1 specifies the failure mode No. of the corresponding analytical data with reference to the link data which has been previously stored in the link data storage unit 14, and increments the number of the item of "hiyari-hatto accumulated counts" in that mode by one.

In the meantime, the item of "accumulated counts of accidents" (309) is manually recorded through the input unit 12 because it is difficult to determine the "accident" from the safety state detection unit only.

As described above, when the item of "hiyari-hatto accumulated counts" and "accumulated counts of accidents" are provided, a real damaged amount by the accident or an estimated damaged amount by hiyari-hatto can be calculated.

FIG. 4 shows an example of contents of design analytical data. As shown in FIG. 4, the design analytical data is formed based on a design FMEA such that related analytical data is recorded every malfunction content ("failure mode") of a product item by item. The item comprise a unit name (type), a unit (401), a module (402), apart (403), a phenomenon generated as malfunction in each part (404), an influence caused by the malfunction (405), a cause of the malfunction (406), measures previously studied (407), and an ID number of a failure mode (failure mode No.) (409). Any item can be provided according to a usage purpose of the system of the present invention.

In the item of "unit" (401), components constituting the product are largely classified. For example, in a case where the product is a photoelectric sensor, the item is classified into a power supply, a signal processing part, a light-emitting part, a light-receiving part, a case, an instruction manual and the like. In the "module" item (402), the unit is further classified. In the "part" item (403), the module is further classified. Although hierarchy of classification and items can be appropriately set depending on necessity or depending on the product, it is needless to say that subsequent measures for malfunction and improvement becomes easy as they are classified finely. The design analytical data is formed based on anticipation of skilled production engineers or product designers such that contents corresponding to each item are recorded before production is started or when the production is started. In this example, although "part number" is not shown as the item, similar to the process analytical data, the components may be parted every content in any item (every "part", for example) and they may be combined to form design analytical data for a new product. In addition, on the basis of indication input from the input unit 12 shown in FIG. 1, the information processing system 1 can sort data based on the contents of the selected item with reference to the design analytical data and display it in the display 11. For example, in the item of "influence" (405), data of each failure mode No. can be rearranged in the order from the one containing higher frequency of appearance. Alternatively, only certain contents in the selected item may be displayed. For example, there is a case in which only data to which "no operation" is input in the item of "influence" can be displayed. In addition, plural items can be sorted by priorities or selectively displayed. For example, the data of the failure mode No. is sorted in the item of "influence" (405) in descending order of frequency of appearance as the first priority and the causes may be displayed in descending order of frequency of appearance in the item of "cause" (406) as the second priority.

FIG. 5 shows an example of contents of malfunction generation historical data. The malfunction generation historical data is formed additionally every time the malfunction is detected, in which ID (malfunction No. (501)) is allotted and related information is recorded every its contents ("failure mode") by items. The items comprise a malfunction number (501), a unit name (type), a serial No./lot No. (503), a manufacturing factory name (504), a line name or number (505), discrimination whether the malfunction is detected in an inspection process or from a claim in the market (506), a date when the malfunction is detected (507), a worker's name who manufactured the product (508), a material of the defective product (509), a process or method in which malfunction was generated (510), a name of machine or jig used in the process or the method (511), a specified defective phenomenon (512), a phenomenon of product defective caused by the phenomenon (513), and a treatment for the malfunction (514).

Any item may be provided depending on a usage purpose of the system of the present invention. The malfunction generation historical data specified in each line is added every time the malfunction is detected and accumulated. Although the contents in each line maybe input anytime, seven items from the "malfunction No." item (501) to the "date" item (507) are input after the malfunction is analyzed and appropriately treated. The malfunction generation historical data can be also sorted based on the contents in the selected item, or only certain contents in the selected item can be displayed. Alternatively, the plural items may be sorted or selectively displayed in the order of priorities. For example, as the first priority, data of the "malfunction No." item (501) is sorted in descending order of frequency of appearance, and as the second priority, data in the other item may be displayed in descending order of frequency of appearance among the data sorted in the first priority.

According to this embodiment, not only the malfunction generation historical data after the production is started, but also malfunction generation historical data obtained in a trial manufacturing in a developing stage of the product are stored. Thus, the malfunction generation historical data can be used immediately after the mass production is started, whereby a malfunction cause can be immediately investigated and appropriate measures are taken.

FIGS. 7 and 8 show an example of contents of the link data. As shown in FIGS. 7 and 8, the data is linked between the malfunction generation historical data and the failure mode No. of the process analytical data (FIG. 7A and FIG. 8B) and between the malfunction generation historical data and the failure mode No, of the design analytical data (FIG. 7A and FIG. 8B). According to this embodiment, the "malfunction No." item (501) of the malfunction generation historical data is linked with the "failure mode No." item (209, 409) of the analytical data.

FIG. 6 shows a flowchart showing processes for linking the data in the information processing system 1. More specifically, when malfunction is detected (YES at step 601), the contents of the malfunction is input by items as the malfunction generation historical data provided that a signal transmitted from the inspection unit or the safety state detection unit is in a predetermined format (YES at step 603). When the signal is not in the predetermined format (NO at step 603), the format is converted with reference to a conversion table stored in the arithmetic processing unit 13 in the information processing system 1 at step 604. Then, it is determined whether the analytical data comprises the failure mode which coincides with the "unit name" item and the "phenomenon" item regarding the malfunction at step 607. When the analytical data comprises the failure mode (YES at step 607), all information in the failure mode is read from the analytical data and the information and the total number of malfunction generation historical data linked to the failure mode are displayed in the display 11 at the same time at step 608. Meanwhile, when the corresponding analytical data does not comprise the corresponding failure mode (NO at step 607), since it means that the failure mode which is not initially assumed is detected, the fact (that the corresponding failure mode is not extracted) is displayed in the display 11 at step 608. Then, referring to the received signal, the malfunction contents are newly added to the analytical database at step 609 and the data is linked by recording the corresponding relation similar to the above. Thus, the malfunction generation historical data is made to correspond to the analytical data every correspondence. In addition, according to this embodiment, the fact that the malfunction of unknown cause is generated and its contents are immediately given to a related section such as production engineering section, together with the error notice at step 608. Therefore, the related section can immediately start to clarify the cause.

As described above, although the number of generation historical data of each phenomenon corresponding to the analytical data can be displayed using the link data in this embodiment, instead of that display, a certain item of the analytical data may be separately selected and the number of malfunction generation historical data corresponding to the item may be displayed in a separate table. The data including the link data may be sorted or selected on the basis of the contents of the selected item and displayed. That is, the linked malfunction generation historical data can be sorted in the order of descending number or only the one having the largest number may be displayed. In addition, the plurality of items including the item of the number of the malfunction generation historical data may be sorted in order of priorities or selectively displayed. Instead of displaying the number, all of the malfunction No. of the corresponding malfunction generation historical data may be displayed. This can be easily implemented by sorting the linked malfunction generation historical data in order of decreasing number of items ("phenomenon", for example) or selectively displaying it. Furthermore, an item of cost may be provided in the malfunction generation historical data and the cost corresponding to each item of the analytical data maybe displayed. Similar to the number of linked malfunction generation historical data, costs may be sorted in decreasing order or only the highest cost may be displayed.

Next, concrete examples (1) to (4) of a method using the improvement support system of this embodiment are sequentially described.

(1) Individual Response when Malfunction is Detected (1) (Short-term Process Improvement)

When malfunction is detected, the contents of the malfunction are recorded in a malfunction generation historical database. At this time, although the items from "malfunction No." to "date" shown in FIG. 5 can be immediately recorded when the malfunction is detected, the items from "worker" to "treatment" cannot be recorded until the malfunction is analyzed and steps are taken to improve the malfunction. According to this embodiment, after the items from "malfunction No." to "date" are input, the process analytical data corresponding to the contents is extracted if it exists in the items of the previously set link data, and it is recorded as the link data and the corresponding process analytical data is displayed. Therefore, when the process analytical data is displayed, measures are immediately taken with reference to the displayed cause and measures. Exceptionally, if there is no corresponding process analytical data, that effect is displayed in the display 11 as described above with reference to the flow chart in FIG. 6. Then, after the malfunction is analyzed and steps are taken to improve the malfunction, remaining items are manually input from the input unit 12. At this time, a new item corresponding to the malfunction is added in the process analytical data. If this addition is performed first, the link data is automatically recorded while the remaining malfunction generation historical data is recorded. Thus, process improvement as the measures for the malfunction can be easily performed without a skilled production engineer. In addition, as the malfunction generation historical data is accumulated, an amount of process analytical data is increased, so that the process malfunction cause can be found out more effectively.

(2) Individual Response when Malfunction is Detected (2) (Short-term Design Improvement)

Here, the design analytical data is intended instead of the process analytical data shown in the individual response (1) when malfunction is detected. Thus, a malfunction part can be immediately detected. Thus, the part can be immediately fixed or improved (the part is changed or instruction is made to lot out the malfunction part) without a skilled production engineer.

(3) Process Improvement (Long-term Improvement)

By using the process analytical data linked with the malfunction generation historical data, the linked malfunction generation historical data is sorted in the order of decreasing number, so that the process in which malfunction is frequently generated can be known. Therefore, the malfunction can be effectively reduced by improving that process intensively. Similarly, when it is sorted in the decreasing order of the cost, the process in which cost for improvement is high can be known. Thus, the cost can be reduced by improving that process intensively. Furthermore, data is expanded by adding items regarding a working environment such as power consumption, quality, safety, and productivity, to the process analytical data or the malfunction generation historical database. When these technical thoughts are taken in, the process in which power consumption is high, the process which largely affects product quality, the dangerous process or the process which largely affects productivity can be found out with reference to the malfunction generation historical data, whereby further effective improvement can be implemented.

(4) Design Improvement (Long-term Improvement)

By using the design analytical data linked with the malfunction generation historical data, the linked malfunction generation historical data is sorted in the order of decreasing number,the part of the product in which the malfunction is generated most frequently can be known. Thus, the malfunction can be effectively reduced by improving the part of the product or adding the improvement to the next product development in view of the above knowledge. Similarly, when it is sorted in the decreasing order of the cost, the part in which cost for improvement is high can be known. Thus, the product can be designed in view of the cost of the malfunction part. In addition, the data can be expanded by adding items regarding information for safety measures such as reliability data corresponding to each standard, environment information whether the product can be disposed of, recycled and reused or not, a quality or a self-judgment level, to the design analytical data or the malfunction generation historical database. When these technical thoughts are taken in, since respective degrees of influences can be known with reference to the malfunction generation historical data, the product can be more effectively designed.

In addition, the improvement support system according to the present invention can be applied when process analytical data or design analytical data are formed for a new product. Although the process analytical data and design analytical data formed by the person skilled in the art are used at first in the above improvement support system, as the malfunction generation historical data is accumulated, the analytical data is also accumulated, so that a larger range of cases can be contained. In other words, according to the basic thought of the present invention, anyone can see the information which only skilled production engineers or production designers have, and anyone can easily extract the contents which were extracted by the skilled engineers by experience or by instinct, by the function of sorting the items of the analytical data in decreasing order of frequency and influence, and displaying them.

According to manufacturing processes of the product, although there are some peculiar steps, they have common steps in many cases, which are constituted by combination thereof. Therefore, by using the improvement support system of this embodiment in which the malfunction modes of the process analytical data are parted as modules and can be freely combined, a most part of the process analytical data can be easily formed for the new product at almost the same level as the skilled persons. It is needless to say that the new process peculiar to the new product is formed by the conventional method.

The same is true for the design analytical data by replacing the above with a unit, a module or a part, so that the design analytical data can be easily formed for the new product.

As an application of this embodiment, it is thought that process analytical data, design analytical data and link data for the plurality of manufacturing processes are integrated in a personal computer serving as a different main server on the network shown in FIG. 1. Thus, there can be provided an improvement support system in which the more number of malfunction generation cases can be contained. In this case, all or related part of the process analytical data, the design analytical data and the link data integrated in the main server is selected and downloaded to the respective improvement support system in each manufacturing process.

In addition, as another application, there may be provided an improvement support system in which a personal computer having no link data is connected to a specific place over the network to browse process analytical data or design analytical data linked to malfunction generation historical data. However, since the database of the improvement support system can be used from any place in the above embodiment without providing the improvement support system in the specific place, the problems can be solved or improved with reference to the contents of the database which has been already constituted without constituting each kind of database by itself.

In addition, as an application for business, a person who manages the above improvement support system may charge for use to a person who uses the database.

What is claimed is:

1. An improvement support system for production of products comprising: an input unit; a display; an arithmetic processing unit; and a storage unit,
wherein for a product failure to be expected, the storage unit stores analytical data comprising analytical information having information corresponding to "phenomenon" or "influence" and "cause" or "measures" for each of a plurality of failure modes which are classified in view of parts constituting the product or manufacturing processes of the product, and
malfunction generation historical data formed based on malfunction contents detected in manufacturing processes of the product in which malfunction information having information corresponding to the "phenomenon" or "influence" of the failure mode in the analytical information is sequentially accumulated, the malfunction generation historical data including a separate ID number for each detected occurrence of product failure, and
the arithmetic processing unit being configured to, for each detected occurrence of a product failure, detect a failure mode having information corresponding to the "phenomenon" or "influence" by searching the analytical data, based on information corresponding to the "phenomenon" or "influence" contained in the malfunction information, relate the detected failure mode to the malfunction information, count the total number of malfunctions related to the detected failure mode, and display the contents of the failure mode together with the total number or based on the total number in the display.

2. The improvement support system according to claim 1, wherein the analytical information is formed based on a process FMEA method and/or a design FMEA method.

3. An improvement support system for production of products comprising: an input unit; a display; an arithmetic processing unit; and a storage unit,
wherein for a product failure to be expected, the storage unit stores analytical data comprising analytical information having information corresponding to "phenomenon" or "influence" and "cause" or "measures" for each of a plurality of failure modes which are classified in view of parts constituting the product or manufacturing processes of the product,
malfunction generation historical data formed based on malfunction contents detected in manufacturing processes of the product in which malfunction information having information corresponding to the "phenomenon" or "influence" of the failure mode in the analytical information is sequentially accumulated, the malfunction generation historical data including a separate ID number for each detected occurrence of product failure, and
link data which records a relation between the failure mode of the analytical data and the malfunction information of the malfunction generation historical data, which have substantially equivalent information corresponding to the "phenomenon" or "influence", and
the arithmetic processing unit being configured to, for each detected occurrence of a product failure, search the analytical data, based on information corresponding to the "phenomenon" or "influence" contained in the malfunction information, record the relation between the failure mode of the analytical data and the malfunction information of the malfunction generation historical data in the link data, count the total number of malfunctions related to the detected failure mode, and display the contents of the failure mode together with the total number or based on the total number in the display.

4. The improvement support system according to claim 3, wherein the arithmetic processing unit forms the link data for relating the malfunction information with the failure mode when detecting the failure mode having substantially equivalent information corresponding to "phenomenon" or "influence" of the malfunction information.

5. An improvement support system for production of products comprising: an input unit; a display; an arithmetic processing unit; and a storage unit,
wherein for a product failure to be expected, the storage unit stores analytical data comprising analytical information having information corresponding to "phenomenon" or "influence" and "cause" or "measures" for each of a plurality of failure modes which are classified in view of manufacturing processes of the product by a process FMEA method, malfunction generation historical data formed based on
process malfunction contents detected in manufacturing
processes of the product in which malfunction informa-
tion having information corresponding to the "phenom-
enon" or "influence" of the failure mode in the analytical
information is sequentially accumulated, the malfunc-
tion generation historical data including a separate ID
number for each detected occurrence of product failure,
and link data which records a relation between the failure mode
of the analytical data and the malfunction information of
the malfunction generation historical data, which have
substantially equivalent information corresponding to
the "phenomenon" or "influence", and the arithmetic processing unit being configured to, for each
detected occurrence of a product failure, search the ana-
lytical data, based on information corresponding to the
"phenomenon" or "influence" contained in the malfunc-
tion information, record the relation between the failure
mode of the analytical data and the malfunction infor-
mation of the malfunction generation historical data in
the link data, count the total number of malfunctions
related to the detected failure mode using the link data,
and display the total number together with the contents
of the failure mode in the display.

6. The improvement support system according to claim 5, wherein the storage unit is constituted such that a database storing the analytical information and a database storing the malfunction generation historical data are connected over a network.

7. The improvement support system according to claim 5, wherein each failure mode of the analytical data is appropriately added and accumulated every time new malfunction contents which does not correspond to the "phenomenon" or "influence" in the information are detected.

8. The improvement support system according to claim 5, wherein contents of the analytical data and the malfunction generation historical data can be rewritten, added, or deleted every item.

9. A storage unit, wherein the analytical data and malfunction generation historical data as set forth in claim 5 are stored.

10. The improvement support system according to claim 5, wherein the contents of any analytical data or malfunction generation historical data can be displayed in the display through the input unit.

11. A record medium, wherein information stored in the storage unit as set forth in claim 5 is recorded.

12. An improvement supporting method of supporting improvement by a user using the improvement support system as set forth in claim 5.

13. An improvement support system for production of products comprising: an input unit; a display; an arithmetic processing unit; and a storage unit,
wherein for a product failure to be expected, the storage unit stores analytical data comprising analytical information having information corresponding to "phenomenon" or "influence" and "cause" or "measures" and "cost required for improvement" for each of a plurality of failure modes which are classified in view of manufacturing processes of the product by a process FMEA method, and malfunction generation historical data formed based on
process malfunction contents detected in manufacturing
processes of the product in which malfunction informa-
tion having information corresponding to the "phenom-
enon" or "influence" of the failure mode in the analytical
information is sequentially accumulated, the malfunc-
tion generation historical data including a separate ID
number for each detected occurrence of product failure,
and link data which records a relation between the failure mode
of the analytical data and the malfunction information of
the malfunction generation historical data, which have
substantially equivalent information corresponding to
the "phenomenon" or "influence", and the arithmetic processing unit being configured to, for each
detected occurrence of a product failure, search the ana-
lytical data, based on information corresponding to the
"phenomenon" or "influence" contained in the malfunc-
tion information, record the relation between the failure
mode of the analytical data and the malfunction infor-
mation of the malfunction generation historical data in
the link data, count the total number of malfunctions
related to the detected failure mode using the link data,
and display the total number together with the contents
of the failure mode including the "cost required for
improvement" in the display.

14. An improvement support system for production of products comprising: an input unit; a display; an arithmetic processing unit; a storage unit; and a safety state detection unit,
wherein for a product failure to be expected, the storage unit stores analytical data comprising analytical information having information corresponding to "phenomenon" or "influence" and "cause" or "measures" and "accumulated counts of reception of output signals" from the safety state detection unit for each of a plurality of failure modes which are classified in view of manufacturing processes by a process FMEA method, and malfunction generation historical data formed based on
process malfunction contents detected in manufacturing
processes of the product in which malfunction informa-
tion having information corresponding to the "phenom-
enon" or "influence" of the failure mode in the analytical
information is sequentially accumulated, the malfunc-
tion generation historical data including a separate ID
number for each detected occurrence of product failure,
and link data which records a relation between the failure mode
of the analytical data and the malfunction information of
the malfunction generation historical data, which have
substantially equivalent information corresponding to
the "phenomenon" or "influence", and the arithmetic processing unit being configured to, for each
detected occurrence of a product failure, search the ana-
lytical data based on information corresponding to the
"phenomenon" or "influence" contained in the malfunc-
tion information, record the relation between the failure
mode of the analytical data and the malfunction infor-
mation of the malfunction generation historical data in
the link data, specify a failure mode corresponding to the
safety state detection unit when receives an output signal
from the safety state detection unit, increment the "accu-
mulated counts of reception of output signals" in the
analytical information item of the specified failure mode
by one, count the total number of malfunctions related to
the detected failure mode using the link data, and display
the total number together with the contents of the failure
mode including the "accumulated counts of reception of
output signals" in the display.

15. The improvement support system according to claim 14, wherein the analytical information further comprises information corresponding to "accumulated counts of accidents" and "amount of damage of accident".

16. An improvement support system for product ion of products comprising: an input unit; a display; an arithmetic processing unit; and a storage unit,
   wherein for a product failure to be expected, the storage unit comprises an analytical database storing analytical information having information corresponding to "phenomenon" or "influence" and "cause" or "measures" for each of a plurality of failure modes which are classified in view of manufacturing processes of the product by a process FMEA method, and
   a track record database storing malfunction generation historical data formed based on process malfunction contents detected in manufacturing processes of the product in which malfunction information having information corresponding to the "phenomenon" or "influence" of the failure mode in the analytical information is sequentially accumulated the malfunction generation historical data including a separate ID number for each detected occurrence of product failure, and
   link data which records a relation between the failure mode of the analytical data and the malfunction information of the malfunction generation historical data, which have substantially equivalent information corresponding to the "phenomenon" or "influence", and
   the arithmetic processing unit being configured to, for each detected occurrence of a product failure, search the analytical data, based on information corresponding to the "phenomenon" or "influence" contained in the malfunction information, record the relation between the failure mode of the analytical data and the malfunction information of the malfunction generation historical data in the link data, and display the analytical information of the failure mode related to the malfunction information when the malfunction information is input in the display.

* * * * *

UNITED STATES PATENT AND TRADEMARK OFFICE
CERTIFICATE OF CORRECTION

| | | |
|---|---|---|
| PATENT NO. | : 7,421,373 B2 | |
| APPLICATION NO. | : 10/869047 | |
| DATED | : September 2, 2008 | |
| INVENTOR(S) | : Kawaike | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this

Eleventh Day of January, 2011

David J. Kappos
*Director of the United States Patent and Trademark Office*